Patented Apr. 22, 1947

2,419,505

UNITED STATES PATENT OFFICE 2,419,505

PROCESS FOR PREPARATION OF ACETONE KETALS

Murray Senkus, Terre Haute, Ind., assignor to Commercial Solvents Corporation, Terre Haute, Ind., a corporation of Maryland No Drawing. Application March 17, 1944, Serial No. 527,004

4 Claims. (Cl. 260—338)

My invention relates to a novel method for the preparation of ketals from acetone. More particularly, it relates to a procedure for the preparation of cyclic ketals from polyhydric alcohols and acetone.

It has been known for some time that ketones will react with polyhydric alcohols to form cyclic ketals. Although reasonably good yields of cyclic ketals could be obtained with the higher ketones, acetone was unique, however, in that it gave yields of cyclic ketals that seldom, if ever, exceeded 40 per cent. Reaction mixtures containing acetone could not be heated to any appreciable extent because of the relatively low boiling point of that ketone. Solvents, such as benzene or the lower aliphatic alcohols, normally used in the preparation of cyclic ketals from the higher ketones are of no value where it is desired to employ acetone since the latter boils so much lower than the aforesaid solvents. The usual procedure has been to employ a large excess of acetone and allow the reaction mixture to stand at room temperature in contact with a suitable catalyst, such as calcium chloride until equilibrium is reached. Obviously, such a method is time-consuming and gives very poor yields of cyclic ketals.

I have now discovered a process for preparing cyclic acetone ketals capable of producing such compounds in yields of 95 per cent and above. Such result is made possible through the use of adding an inert liquid to the reaction mixture which forms a maximum constant boiling mixture with acetone. Liquid compounds capable of forming maximum constant boiling mixtures with acetone are those composed of molecules containing active hydrogen, but no donor atoms. Such compounds have two or three halogen atoms (chlorine or bromine) on the same carbon atom holding a hydrogen atom, or one halogen atom on the same carbon and one or more halogens on adjacent carbons. Examples of such compounds are chloroform, methylene chloride, 1,1-dichloroethane, 1,2-dichloroethane, 1,2,3-trichloropropane, 1,1,2-trichloropropane, the bromine analogs thereof, etc.

While the discussion which follows relates particularly to the use of chloroform-acetone mixtures, it is to be specifically understood that my invention is not restricted thereto, but on the contrary any compound having the constitution indicated above is operative in my process.

During the process of heating the reaction mixture, water is liberated as a result of the chemical combination of acetone with the polyhydric alcohol. The water thus formed is withdrawn from the zone of reaction in the form of a minimum constant boiling mixture with chloroform, which boils at 56° C. While acetone normally boils at 56.5° C., in the presence of chloroform a maximum boiling mixture is formed boiling at approximately 65° C. This maximum constant boiling mixture makes possible the removal of water from the reaction mixture without the loss of acetone and permits the reaction to proceed to completion at elevated temperatures.

In practicing my invention, a mixture consisting of the polyhydric alcohol and acetone in approximately equivalent molecular quantities, chloroform in an amount preferably equal to or from about 10 to 15 per cent, by weight, in excess of the acetone present, and a catalytic quantity of a strong acid, such as for example, p-toluenesulfonic acid, sulfuric acid, hydrochloric acid, and the like, is refluxed and the distillate conducted to a decanter where the lower chloroform layer is separated and returned to the reaction vessel. When no additional water comes over in the distillate, heating is discontinued and the residue in the still kettle is washed with aqueous alkali in order to remove the acid catalyst. The residue thus treated is next washed with water to remove any unreacted polyhydric alcohol which might be present. The washed product is then rectified through a suitable fractionating column and the desired cyclic acetone ketal collected.

It will be readily recognized that the cyclic acetone ketals derived from some of these polyhydric alcohols are theoretically possible of existing as stereoisomers, and in certain instances, such isomers have been isolated and characterized.

A wide variety of polyhydric alcohols may be utilized in the preparation of the cyclic ketals in accordance with the process of my invention. In general, it may be said that any polyhydric alcohol having hydroxyl groups on adjacent or alternate carbon atoms is operative in the process of my invention. As examples of such alcohols, there may be mentioned glycerine, ethylene glycol, propylene glycol, 2,3-butanediol, 1,3-butanediol, 1,3-propanediol, 1-chloro-2,3-propanediol, tris (hydroxymethyl) nitromethane, 2-nitro-2-ethyl-1,3 - propanediol, 2-nitro-2-methyl-1,3-propanediol, 2-nitro-1,3-propanediol, and the like.

My invention may be further described by the specific example which follows. However, it is to be strictly understood that such an example in no way limits the scope of my invention since I have found that the general process which is about to be described in detail is equally applicable to the preparation of numerous cyclic ketals from acetone.

Example

A mixture consisting of 1000 grams of 2,3-butanediol, 650 grams of acetone, 750 grams of chloroform, and 5 grams of p-toluenesulfonic acid was heated to reflux temperature and the minimum constant boiling mixture of chloroform and water boiling at 56° C. was condensed and conducted to a suitable separator from which the lower chloroform layer was returned to the reaction vessel. When the distillate came over as a homogeneous mixture, distillation was discontinued and the reaction mixture was washed with 500 ml. of 2-N sodium hydroxide solution, and then with 500 ml. of water. The washed liquid product was next rectified through a suitable fractionating column. As a result, there were obtained in the distillate two stereoisomers of 2,2,4,5-tetramethyl-1,3-dioxolane. This product, which was water-white, was obtained in 95 per cent yield and the major portion consisted of isomer II. The individual isomers analyzed as follows:

| Isomer | Analysis | | | | B. P., °C. at 760 mm. | $d_{20}^{20}$ | $n_D^{20}$ |
|---|---|---|---|---|---|---|---|
| | Carbon | | Hydrogen | | | | |
| | Calc'd. | Found | Calc'd. | Found | | | |
| I | 64.58 | 64.51 | 10.83 | 10.64 | 112–113 | 0.8807 | 1.3953 |
| II | 64.58 | 63.26 | 10.83 | 10.50 | 117–119 | 0.8966 | 1.4019 |

Compounds of the class prepared in accordance with the process of my invention are, in general, water-white liquids and are useful as solvents for numerous film-forming materials. Other uses of such compounds will be apparent to those skilled in the art. It will also be obvious to those familiar with the art to which the present invention is directed that the general procedure outlined above is subject to numerous modifications. In general, it may be stated that any such modifications which would normally occur to those skilled in the art are to be construed as coming within the scope of my invention.

My invention now having been described, what I claim is:

1. In a process for the synthesis of cyclic ketals from polyhydric alcohols and acetone, the improvement comprising reacting a polyhydric alcohol selected from the group consisting of unsubstituted, chloro-substituted, and nitro-substituted polyhydric lower alkanols having hydroxyl groups on adjacent carbon atoms, and unsubstituted, chloro-substituted, and nitro-substituted polyhydric lower alkanols having hydroxyl groups on alternate carbon atoms with acetone in the presence of a ketalization catalyst and a compound selected from the group consisting of chloro- and bromo-hydrocarbons having from two to three halogen atoms on the same carbon atom holding a hydrogen atom, and one or more of said halogens on adjacent carbon atoms, and which form a maximum boiling azeotrope with acetone and a minimum boiling azeotrope with water.

2. In a process for the synthesis of cyclic ketals from polyhydric alcohols and acetone, the improvement comprising reacting a polyhydric alcohol selected from the group consisting of unsubstituted, chloro-substituted, and nitro-substituted polyhydric lower alkanols having hydroxyl groups on adjacent carbon atoms, and unsubstituted, chloro-substituted, and nitro-substituted polyhydric lower alkanols having hydroxyl groups on alternate carbon atoms with acetone in the presence of chloroform and a ketalization catalyst.

3. In a process for the synthesis of cyclic ketals from polyhydric alcohols and acetone, the improvement comprising reacting a polyhydric alcohol selected from the group consisting of unsubstituted, chloro-substituted, and nitro-substituted polyhydric lower alkanols having hydroxyl groups on adjacent carbon atoms, and unsubstituted, chloro-substituted, and nitro-substituted polyhydric lower alkanols having hydroxyl groups on alternate carbon atoms with acetone in the presence of chloroform and a ketalization catalyst, removing the water formed during the reaction as a constant boiling mixture with chloroform, separating the unreacted acetone and polyhydric alcohol from the crude cyclic ketal and thereafter recovering the latter in purified form.

4. The process of claim 1 in which the polyhydric alkanol is 2,3-butanediol.

MURRAY SENKUS.

REFERENCES CITED

The following references are of record in the file of this patent:

UNITED STATES PATENTS

| Number | Name | Date |
|---|---|---|
| 2,260,261 | Morey | Oct. 21, 1941 |
| 1,934,309 | Hoover | Nov. 7, 1933 |
| 2,223,421 | Hubacker et al. | Dec. 3, 1940 |
| 2,065,125 | Dreyfus | Dec. 22, 1936 |
| 1,572,176 | Altwegg | Feb. 9, 1926 |
| 2,312,298 | Marple | Feb. 23, 1943 |

FOREIGN PATENTS

| Number | Country | Date |
|---|---|---|
| 503,497 | German | Aug. 7, 1930 |

OTHER REFERENCES

Chem. Abstracts, vol. 31, page 1764, citing: Rec. Trav. Chim., vol. 55, pp. 1036–9 (1936).

Journal American Chemical Society 63, 2475 (1941).